US011038388B2

(12) United States Patent
Soma et al.

(10) Patent No.: US 11,038,388 B2
(45) Date of Patent: Jun. 15, 2021

(54) ROTOR OF ROTARY ELECTRIC MACHINE

(71) Applicant: HONDA MOTOR CO., LTD., Tokyo (JP)

(72) Inventors: Shingo Soma, Saitama (JP); Yoshihisa Kubota, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 110 days.

(21) Appl. No.: 15/919,840

(22) Filed: Mar. 13, 2018

(65) Prior Publication Data

US 2018/0269734 A1    Sep. 20, 2018

(30) Foreign Application Priority Data

Mar. 14, 2017    (JP) .............................. JP2017-049167

(51) Int. Cl.
*H02K 1/27*    (2006.01)
*H02K 21/14*    (2006.01)

(52) U.S. Cl.
CPC ........... *H02K 1/2766* (2013.01); *H02K 21/14* (2013.01); *H02K 2213/03* (2013.01)

(58) Field of Classification Search
CPC ........ H02K 1/27; H02K 1/276; H02K 1/2766; H02K 1/2773; H02K 21/12; H02K 21/14
(Continued)

(56) References Cited

U.S. PATENT DOCUMENTS 5,945,760 A * 8/1999 Honda .................... H02K 1/276
                                                  310/156.53
2014/0152139 A1* 6/2014 Huang .................... H02K 21/16
                                                  310/156.38
(Continued)

FOREIGN PATENT DOCUMENTS

| CN | 102780291 A | 11/2012 |
|---|---|---|
| CN | 203151254 U | 8/2013 |
| CN | 104011974 A | 8/2014 |
| JP | H08-331783 A | 12/1996 |
| JP | 2011-083066 A | 4/2011 |
| JP | 2015-122838 A | 7/2015 |

OTHER PUBLICATIONS

Oct. 23, 2018, Japanese Office Action issued for related JP application No. 2017-049167.
Aug. 22, 2019, Chinese Office Action issued for related CN Application No. 201810198325.3.

*Primary Examiner* — Quyen P Leung
*Assistant Examiner* — Alexander Moraza
(74) *Attorney, Agent, or Firm* — Paratus Law Group, PLLC

(57) ABSTRACT

A rotor of a rotary electric machine includes a rotor core of an approximately annular shape which has plural sets of plural magnet insertion holes arranged radially, the plural sets being arranged in a circumferential direction with a predetermined gap, and plural permanent magnets which are inserted into the magnet insertion holes, respectively. Each permanent magnet has a circular arc shape in a radial section, and a curved surface thereof is convex toward a rotation shaft of the rotor. Plural permanent magnets which are respectively inserted into the radially arranged plural magnet insertion holes in each set includes a first permanent magnet which is positioned on an outer circumferential surface side and a second permanent magnet which is positioned on a rotation shaft side and has a radial thickness equal to or larger than a radial thickness of the first permanent magnet.

7 Claims, 9 Drawing Sheets

(58) Field of Classification Search
USPC .................. 310/156, 156.53, 156.56, 156.44
See application file for complete search history.

(56) References Cited

U.S. PATENT DOCUMENTS

| | | |
|---|---|---|
| 2014/0167550 A1 | 6/2014 | Huang et al. |
| 2014/0346911 A1 | 11/2014 | Tsuchida et al. |
| 2016/0285327 A1 | 9/2016 | Sasaki et al. |
| 2016/0344274 A1* | 11/2016 | Jurkovic .............. H02K 1/2766 |
| 2017/0144693 A1* | 5/2017 | Okubo .................... B62D 5/04 |
| 2017/0302117 A1* | 10/2017 | Fukumoto ................ H02K 1/22 |
| 2018/0054098 A1* | 2/2018 | Toida ....................... H02K 1/27 |

* cited by examiner

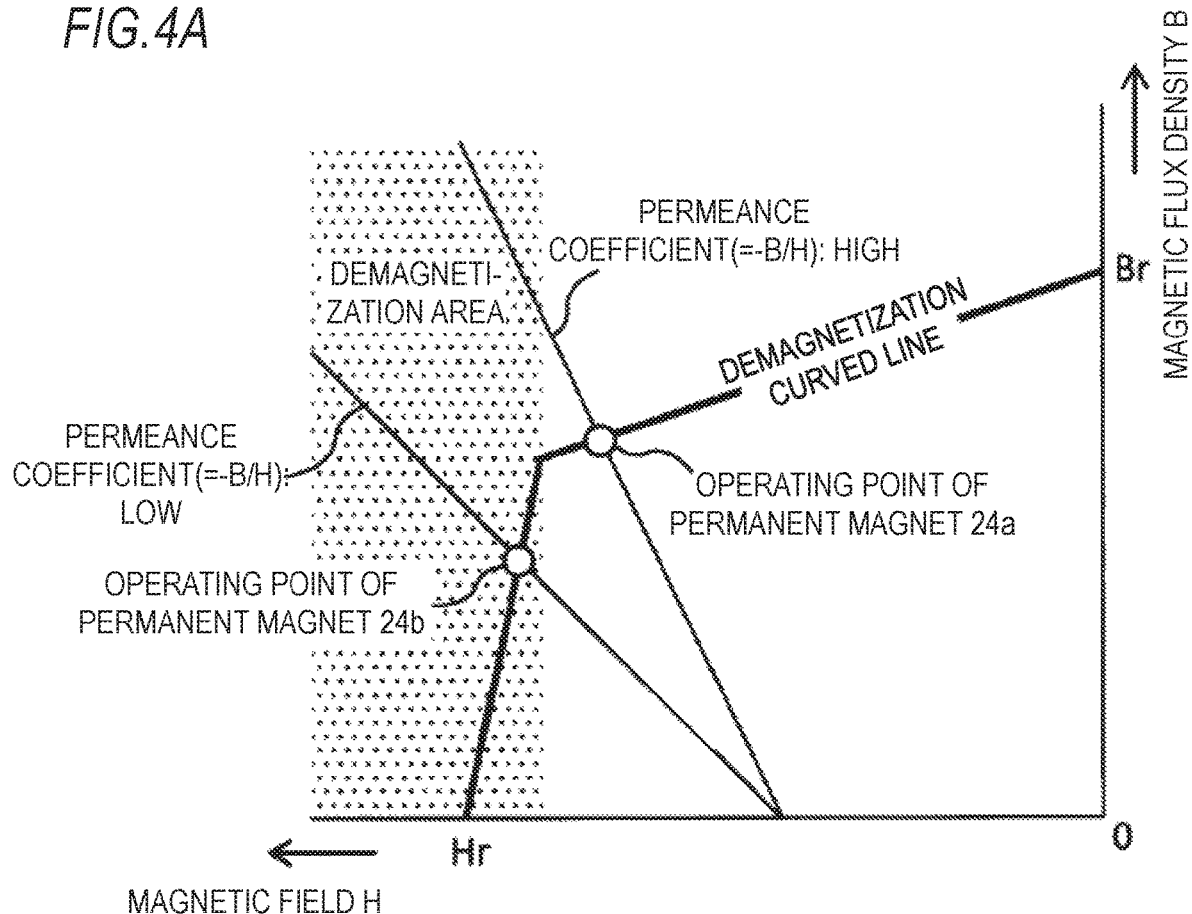

ROTOR OF ROTARY ELECTRIC MACHINE

CROSS-REFERENCE TO RELATED APPLICATION

This application claims priority from Japanese Patent Application No. 2017-049167 filed on Mar. 14, 2017, the entire contents of which are incorporated herein by reference.

TECHNICAL FIELD

The present invention relates to a rotor of a rotary electric machine.

BACKGROUND ART

JP-A-2015-122838 discloses a rotor of a motor in which an outermost peripheral permanent magnet and an inner permanent magnet are provided therein. The outermost peripheral permanent magnet is a permanent magnet which is embedded in an arc shape convex toward the inner side of the rotor, and the inner permanent magnet is a permanent magnet which is embedded in the rotor in parallel to the outermost peripheral permanent magnet. In a permanent magnet embedded synchronous motor (IPM synchronous motor) disclosed in JP-A-2015-122838, a reverse magnetic field is applied to the permanent magnet by a rotating magnetic field, and the reverse magnetic field acts on the permanent magnet as a demagnetizing field. Therefore, the permanent magnet at a position where a strong demagnetizing field acts may be demagnetized when a coercive force is small. If a motor is used in a state where demagnetization easily occurs, there is a possibility that the required performance of the motor is not satisfied.

In the rotor disclosed in JP-A-2015-122838, the arc angle of each permanent magnet is larger than 90°, the thickness of the center portion of the inner permanent magnet is smaller than the thickness of the center portion of the outermost peripheral permanent magnet, and the thickness of the end portions of the inner permanent magnet are larger than the thickness of the end portions of the outermost peripheral permanent magnet. A magnetic body between the permanent magnets is thickened by making the thicknesses of the center portion of the inner permanent magnet smaller than that of the outermost peripheral permanent magnet, so as to increase a d-axis magnetic flux which passes between the permanent magnets. There is a possibility that demagnetization occurs due to bringing the end portions of the inner permanent magnet close to the outer circumference side of the rotor. However, demagnetization resistance can be increased by making the thickness of the end portions of the inner permanent magnet larger than that of the outermost peripheral permanent magnet.

As disclosed in JP-A-2015-122838, the permanent magnet of the rotor used in the IPM synchronous motor is formed in the arc shape convex toward the inner side of the rotor, and the thickness of the end portions of each permanent magnet is formed to be characteristic, the demagnetization resistance can be improved. However, the inner permanent magnet included in the rotor of JP-A-2015-122838 is configured such that the thickness of the center portion is smaller than that of the outermost peripheral permanent magnet, and the thickness of the end portions is larger than that of the outermost peripheral permanent magnet. That is, the inner permanent magnet is configured such that the center portion and the end portion are different from each other in a thickness. Therefore, the manufacturing process of the inner permanent magnet is complicated, so as to increase the manufacturing cost of the motor. Further, an innermost peripheral inner permanent magnet is divided into two, and a rib is provided for the rotor core between the permanent magnets. The manufacturing process of the rotor is further complicated since the rib is provided in the rotor core, and thus the manufacturing cost of the motor is increased. Further, a method of improving the torque and the demagnetization resistance of the IPM synchronous motor having the rotor including the arc-shaped permanent magnet is not limited to the configuration described in JP-A-2015-122838.

SUMMARY

An aspect of the present invention provides a rotor of a rotary electric machine which improves a demagnetization resistance.

According to an embodiment of the present invention, there is provided (1) a rotor (e.g., a rotor 20 in an embodiment to be described below) of a rotary electric machine (e.g., a rotary electric machine 10 in the embodiment) including:

a rotor core (e.g., a rotor core 22 in the embodiment) of an approximately annular shape which is formed with a plurality of sets of plural magnet insertion holes (e.g., magnet insertion holes 44a, 44b in the embodiment), the plurality of sets being arranged in a circumferential direction with a predetermined gap, the plural magnet insertion holes being arrange radially in each set; and a plurality of permanent magnets (e.g., permanent magnets 24 in the embodiment) which are inserted into the magnet insertion holes, respectively, wherein each permanent magnet has a circular a circular arc shape in a radial section, and a curved surface thereof is convex toward a rotation shaft (e.g., a rotation shaft 21 in the embodiment) of the rotor, and wherein plural permanent magnets which are respectively inserted into the radially arranged plural magnet insertion holes in each set includes a first permanent magnet (e.g., a permanent magnet 24a in the embodiment) which is positioned on an outer circumferential surface (e.g., an outer circumferential surface 22a in the embodiment) side of the rotor core and a second permanent magnet (e.g., a permanent magnet 24b in the embodiment) which is positioned on a rotation shaft side of the rotor and has a radial thickness (e.g., a radial thickness d2 in the embodiment) equal to or larger than a radial thickness (e.g., a radial thickness d1 in the embodiment) of the first permanent magnet.

(2) In the rotor of (1), a curved longitudinal length (e.g., a longitudinal length L2 in the embodiment) of the second permanent magnet may be equal to or larger than a curved longitudinal length (e.g., the longitudinal length L1 in the embodiment) of the first permanent magnet.

(3) In the rotor of (2), a longitudinal end surface (e.g., an end surface 24ae in the embodiment), which faces an outer circumferential surface of the rotor core, of the first permanent magnet and a longitudinal end surface (e.g., an end surface 24be in the embodiment), which faces the outer circumferential surface of the rotor core, of the second permanent magnet may be positioned on an axial surface which passes through a common center point (e.g., a center point Om in the embodiment) of a circular arc formed by the first permanent magnet and a circular arc formed by the second permanent magnet.

(4) In the rotor of any one of (1) to (3), a gap (e.g., a gap Rp in the embodiment) formed between a radial inner end surface of the first permanent magnet and a radial outer end surface of the second permanent magnet on a line which passes through a common center point (e.g., the center point Om in the embodiment) of a circular arc formed by the first permanent magnet and a circular arc formed by the second permanent magnet may be approximately equal to a circumferential length of a tooth (e.g., a tooth 31 in the embodiment) of a stator (e.g., a stator 30 in the embodiment) which is provided on an outer circumference side of the rotor and generates a rotating magnetic field.

(5) In the rotor of (1), the gap may be equal to or larger than a radially inner side length (e.g., a radially inner length ST1 in the embodiment) of the tooth and equal to or smaller than a radially outer side length (e.g., a radially outer length ST2 in the embodiment) of the tooth.

(6) In the rotor of any one of (1) to (5), the rotor core may be formed with three magnet insertion holes arranged radially in each set, and radial thicknesses of three permanent magnets which are respectively inserted into the three magnet insertion holes in each set may become larger toward the rotation shaft of the rotor.

Advantageous

When the second permanent magnet positioned on the rotation shaft side of the rotor is thinner than the first permanent magnet positioned on the outer circumferential surface side of the rotor core, the reverse magnetic field which the permanent magnet receives due to the rotating magnetic field generated by the stator when a current flows to the coil of the stator provided on the outer circumference side of the rotor is larger in the first permanent magnet and is smaller in the second permanent magnet. The second permanent magnet further receives the reverse magnetic field due to the magnetic flux of the first permanent magnet as well as the reverse magnetic field due to the rotating magnetic field. Accordingly, the second permanent magnet is easily affected by the reverse magnetic field. Thus, the permeance coefficient of the second permanent magnet is lower than the permeance coefficient of the first permanent magnet, and the demagnetization resistance deteriorates.

According to the configuration of (1), the radial thickness of the second permanent magnet positioned on the rotation shaft side of the rotor is larger than the radial thickness of the first permanent magnet positioned on the outer circumferential surface side of the rotor core. Thus, the permeance coefficient of the second permanent magnet approximates to the permeance coefficient of the first permanent magnet. As a result, the difference between the permeance coefficients of both two permanent magnets becomes smaller, and the demagnetization resistance is increased. The demagnetization resistance of the rotor is improved to obtain the rotary electric machine in which the torque is increased.

According to the configuration of (2), the curved longitudinal length of the second permanent magnet is equal to or larger than the curved longitudinal length of the first permanent magnet. The permeance coefficient of the second permanent magnet approximates to the permeance coefficient of the first permanent magnet when the curved longitudinal length of the second permanent magnet is equal to or larger than the curved longitudinal length of the first permanent magnet. Thus, the difference between the permeance coefficients of both two permanent magnets becomes smaller, and the demagnetization resistance is increased.

According to the configuration of (3), the longitudinal end surfaces, which face the outer circumferential surface of the rotor, of two permanent magnets are positioned on the surface which passes through the common center point of the circular arcs formed by two permanent magnets. The permeance coefficients of the permanent magnets approximate to each other most equally, and thus the demagnetization resistance can be maximized.

According to the configuration of (4), the gap between the first permanent magnet and the second permanent magnet is approximately equal to the circumferential length of the tooth of the stator. Thus, the reluctance torque in a q-axial direction is increased, and the torque capacity of the rotary electric machine can be improved.

According to the configuration of (5), the gap between the first permanent magnet and the second permanent magnet is equal to or larger than the radially inner side length of the tooth of the stator and is equal to or smaller than the radially outer side length. Thus, the reluctance torque of the q-axial direction can be maximized, and the torque capacity of the rotary electric machine can be improved to the maximum.

According to the configuration of (6), the radial thicknesses of three permanent magnets arranged radially become larger toward the rotation shaft of the rotor. Thus, the difference between the permeance coefficients of three permanent magnets can be decreased, and the demagnetization resistance can be improved.

BRIEF DESCRIPTION OF THE DRAWINGS

FIG. 4A is a diagram showing a permeance coefficient of each permanent magnet in a case where a radial thickness of a permanent magnet on an outer circumferential surface side is larger.

DESCRIPTION OF EMBODIMENT

Figure 1:
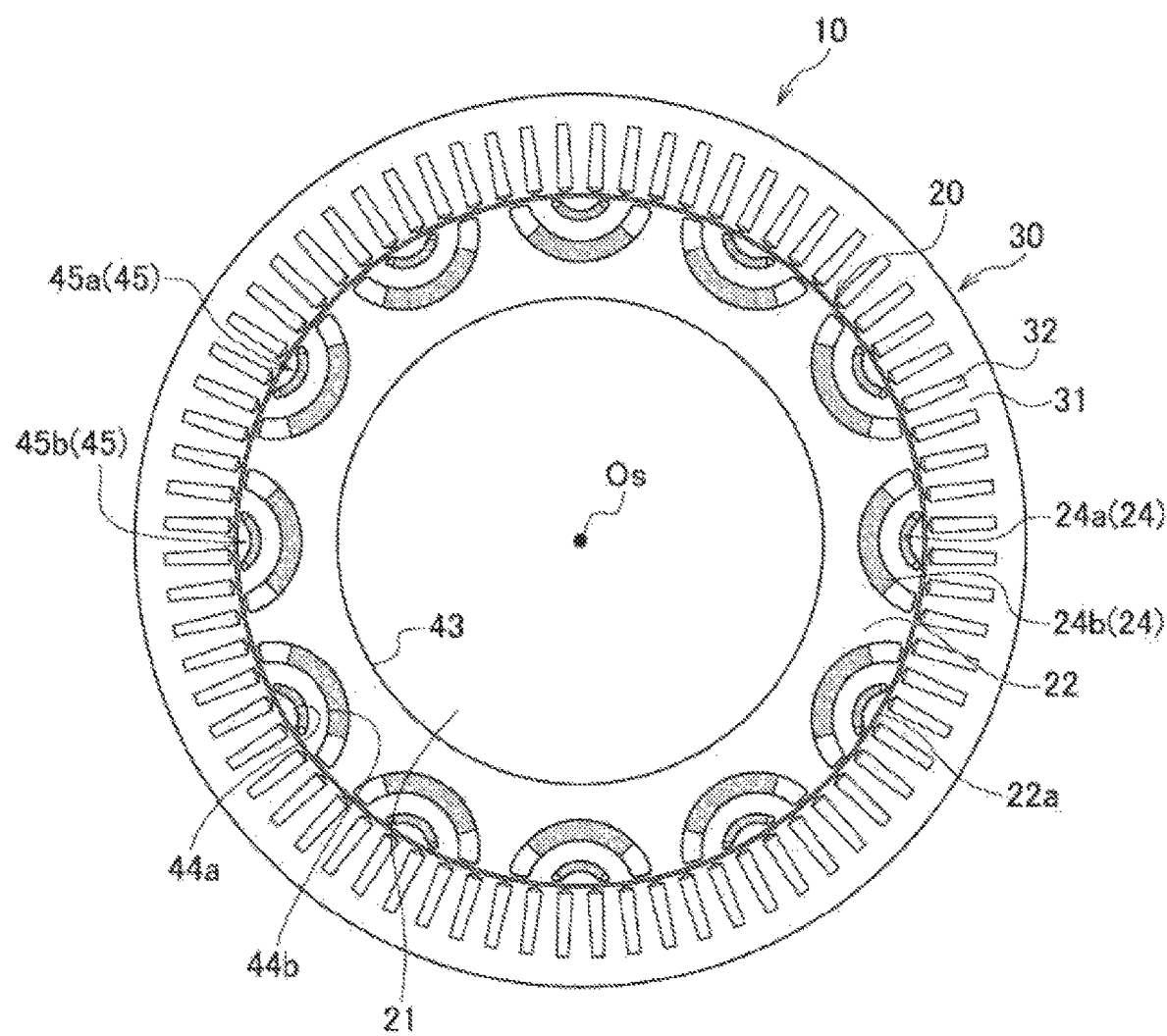
FIG. 1 is a radial sectional view of a rotary electric machine according to an embodiment of the invention.

Hereafter, embodiments of the present invention will be described with reference to the drawings. It is assumed that the drawings are seen in a direction of the reference numerals.

FIG. 1 is a radial sectional view of a rotary electric machine according to an embodiment. A rotary electric machine 10 illustrated in FIG. 1 includes a rotor 20 and a stator 30 which is arranged on a radially outside of the rotor 20 to face the rotor 20 with a slight gap interposed therebetween. The rotary electric machine 10 is configured such that the rotor 20 is rotated by applying a current to coils 32 wound on teeth 31 of the stator 30.

The rotor 20 is a rotor of a so-called permanent magnet embedded-type rotary electric machine (IPM motor) which includes a rotation shaft 21 which is rotatably supported by a housing (not shown), a rotor core 22 which is fixed to an outer circumferential surface of the rotation shaft 21, and a plurality of permanent magnets 24 which are embedded in the rotor core 22.

The rotor core 22 is formed by stacking a plurality of circular electromagnetic steel sheets having approximately same annular shape. Each electromagnetic steel sheet has a shaft insertion hole 43 in a center portion, into which the rotation shaft 21 is inserted. In the outer peripheral portion, a plurality of pairs of two magnet insertion holes 44a, 44b arranged radially are formed with a predetermined gap in the circumferential direction. Incidentally, the electromagnetic steel sheet is formed of a magnetic material, and the permanent magnets 24 which are inserted into the two magnet insertion holes 44a, 44b arranged radially are formed in pairs, so as to configure one magnetic pole 45.

The two magnet insertion holes 44a, 44b each has a circular arc shape which is curved in a convex shape toward the rotation shaft 21, and both end portions in the curved longitudinal direction extend to a side close to the outer circumferential surface 22a of the rotor core 22. Therefore, the longitudinal curved length of the magnet insertion hole 44b provided in the rotation shaft 21 side is longer than the longitudinal curved length of the magnet insertion hole 44a provided in the outer circumferential surface 22a of the rotor core 22. A curvature of a circular arc formed by the magnet insertion hole 44a is the same as a curvature of a circular arc formed by the magnet insertion hole 44b. Therefore, a center point of a circle including the circular arc formed by the magnet insertion hole 44a is the same as a center point of a circle including the circular arc formed by the magnet insertion hole 44b. In other words, the circle including the circular arc formed by the magnet insertion hole 44a and the circle including the circular arc formed by the magnet insertion hole 44b are positioned on concentric circles having the center point.

Two permanent magnets 24a, 24b which have circular arc shapes in a radial section and have the same curvatures as those of the circular arcs formed by the magnet insertion holes 44a, 44b are inserted into the two magnet insertion holes 44a, 44b, respectively. The permanent magnets having the same magnetization direction are inserted into the two magnet insertion holes 44a, 44b configuring one magnetic pole 45, and the permanent magnets are inserted such that magnetic poles are inverted alternately in the circumferential direction. For example, as illustrated in FIG. 1, when the outer circumference side of the magnetic pole 45a is set as an N pole, in an adjacent magnetic pole 45b, the permanent magnets 24a, 24b are inserted into the magnet insertion holes 44a, 44b such that an outer circumference side is set as an S pole.

Figure 2:
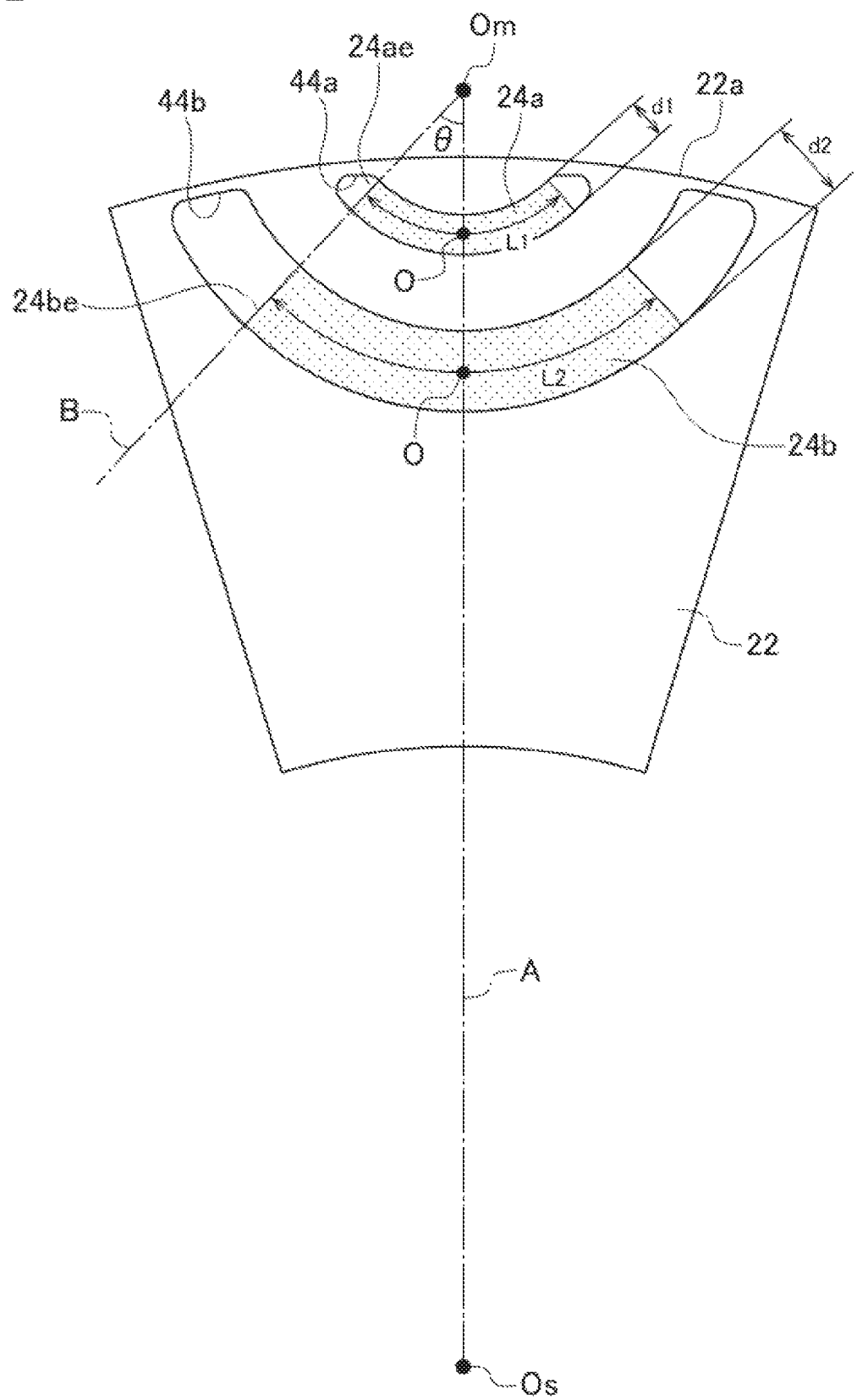
FIG. 2 is an enlarged view of a portion corresponding to one magnetic pole of a rotor of the rotary electric machine illustrated in FIG. 1 when viewed in an axial direction.

FIG. 2 is an enlarged view of a portion corresponding to one magnetic pole of the rotor 20 of the rotary electric machine 10 illustrated in FIG. 1 when viewed in the axial direction. As illustrated in FIG. 2, in the two permanent magnets 24a, 24b radially arranged side by side, a radial thickness d2 of the permanent magnet 24b positioned on the rotation shaft 21 side of the rotor 20 is equal to or larger than a radial thickness d1 of the permanent magnet 24a positioned on the outer circumferential surface 22a side of the rotor core 22. That is, a relation of "d1≤d2" is satisfied. Further, a curved longitudinal length L2 of the permanent magnet 24b is equal to or larger than a curved longitudinal length L1 of the permanent magnet 24a. That is, a relation of "L1≤L2" is satisfied.

Center points O of the two permanent magnets 24a, 24b in the curved longitudinal direction are positioned on a line segment A connecting a center point Om of the circles including the circular arcs formed by the magnet insertion holes 44a, 44b and a center point Os of the rotation shaft 21 when viewed in the axial direction. Further, an end surface 24ae of the permanent magnet 24a which faces the outer circumferential surface 22a of the rotor core 22 and is provided in a direction from the center point O, and an end surface 24be of the permanent magnet 24b which faces the outer circumferential surface 22a of the rotor core 22 and is provided in a direction from the center point O are positioned on the same line segment B passing through the center point Om which is the center point of the circles including the circular arcs formed by the permanent magnets 24a, 24b. Incidentally, since the rotor core 22 has an approximately annular shape, the end surfaces 24ae, 24be of the permanent magnets 24a, 24b are positioned on the surface which includes the line segment B and extends in the axial direction.

Figure 3:
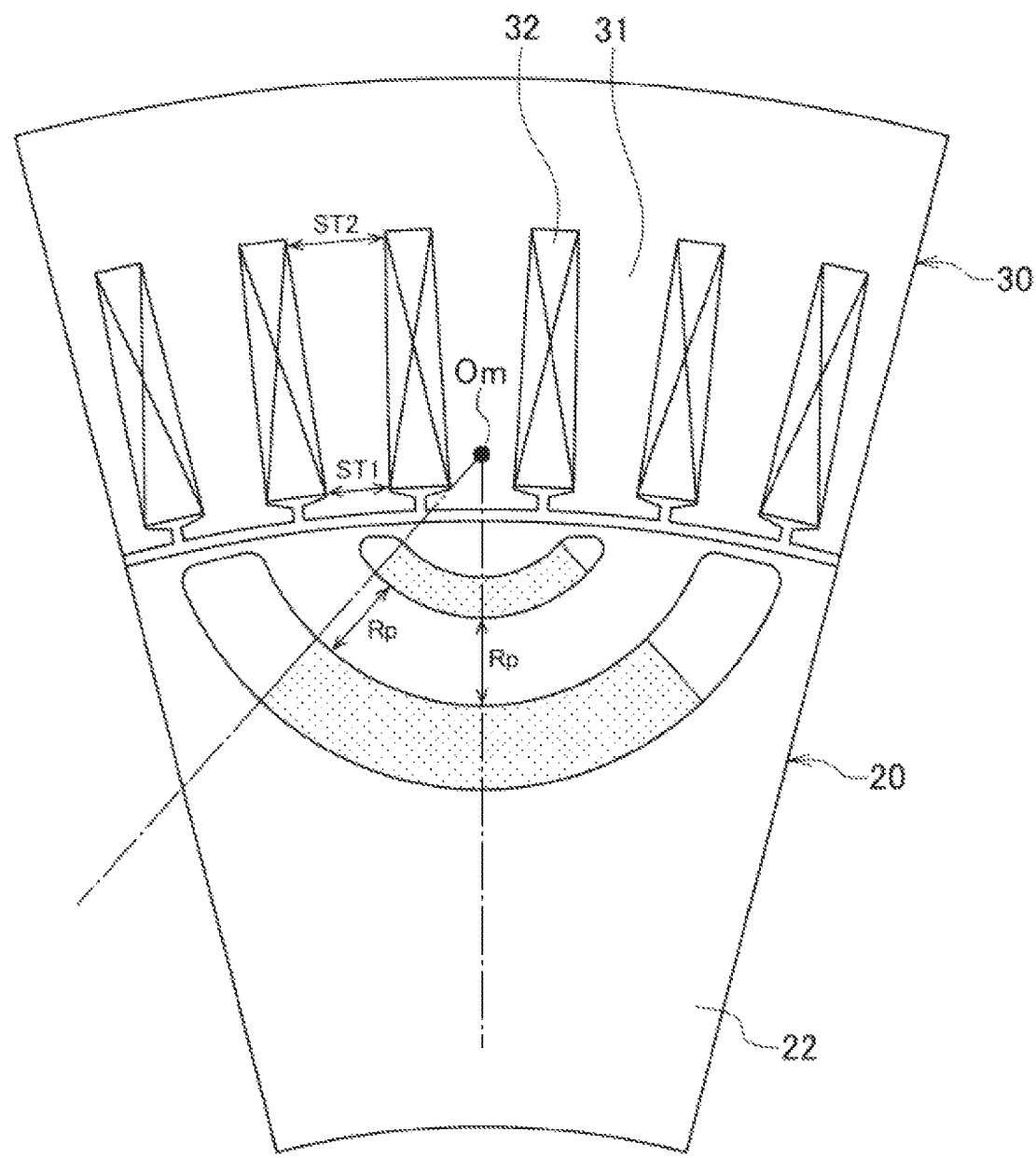
FIG. 3 is an enlarged view of a portion corresponding to one magnetic pole of the rotor and a stator of the rotary electric machine illustrated in FIG. 1 when viewed in the axial direction.

FIG. 3 is an enlarged view of a portion corresponding to one magnetic pole of the rotor 20 and the stator 30 of the rotary electric machine 10 illustrated in FIG. 1 when viewed in the axial direction. As illustrated in FIG. 3, a gap Rp formed between the radial inner end surface of the permanent magnet 24a and the radial outer end surface of the permanent magnet 24b on the line which passes through the center point Om is approximately equal to the circumferential length of the tooth 31 of the stator 30, and preferably equal to or larger than the radially inner side length ST1 of the tooth 31 and equal to or smaller than the radially outer side length ST2 of the tooth 31. That is, a relation of "ST1≤Rp≤ST2" is satisfied.

As described above, in this embodiment, the radial thickness d2 of the permanent magnet 24b positioned on the rotation shaft 21 side of the rotor 20 is larger than the radial thickness d1 of the permanent magnet 24a positioned on the outer circumferential surface 22a side of the rotor core 22. Contrary to this embodiment, in a case where the radial thickness of the permanent magnet 24a is larger and the radial thickness of the permanent magnet 24b is smaller, the reverse magnetic field which the permanent magnet 24 receives due to the rotating magnetic field generated by the stator 30 is larger in the permanent magnet 24a, and is smaller in the permanent magnet 24b. The permanent magnet 24b further receives the reverse magnetic field due to a magnetic flux of the permanent magnet 24a as well as the reverse magnetic field due to the rotating magnetic field. Therefore, as illustrated in FIG. 4A, the permeance coefficient of the permanent magnet 24b is lower than the permeance coefficient of the permanent magnet 24a, and the permeance coefficients of both two permanent magnets 24a, 24b are different from each other, so that the demagnetization resistance deteriorates.

Figure 4B:
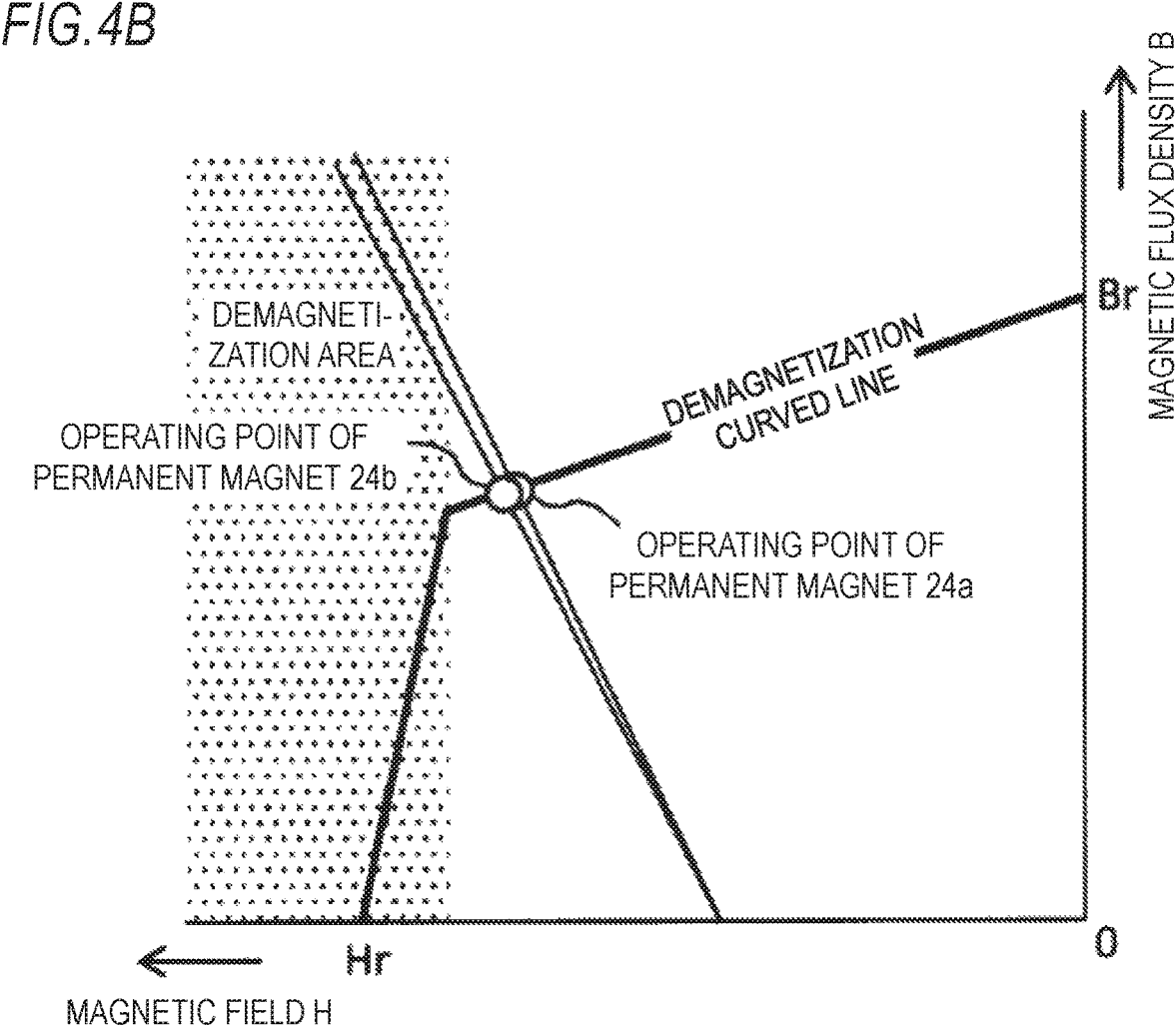
FIG. 4B is a diagram showing a permeance coefficient of each permanent magnet in a case where a radial thickness of a permanent magnet on a rotation shaft side is larger.

However, in this embodiment as described above, the radial thickness of the permanent magnet 24a is smaller, and the radial thickness of the permanent magnet 24b is larger. Thus, the permanent magnet 24b hardly receives the reverse magnetic field due to the magnetic flux of the permanent magnet 24a, and as illustrated in FIG. 4B, the permeance coefficient of the permanent magnet 24b approximates to the permeance coefficient of the permanent magnet 24a. As a result, the difference between the permeance coefficients of both two permanent magnets 24a, 24b becomes small, and the demagnetization resistance is increased. The demagnetization resistance of the rotor 20 is improved to obtain the rotary electric machine having an improved torque.

Figure 5A:
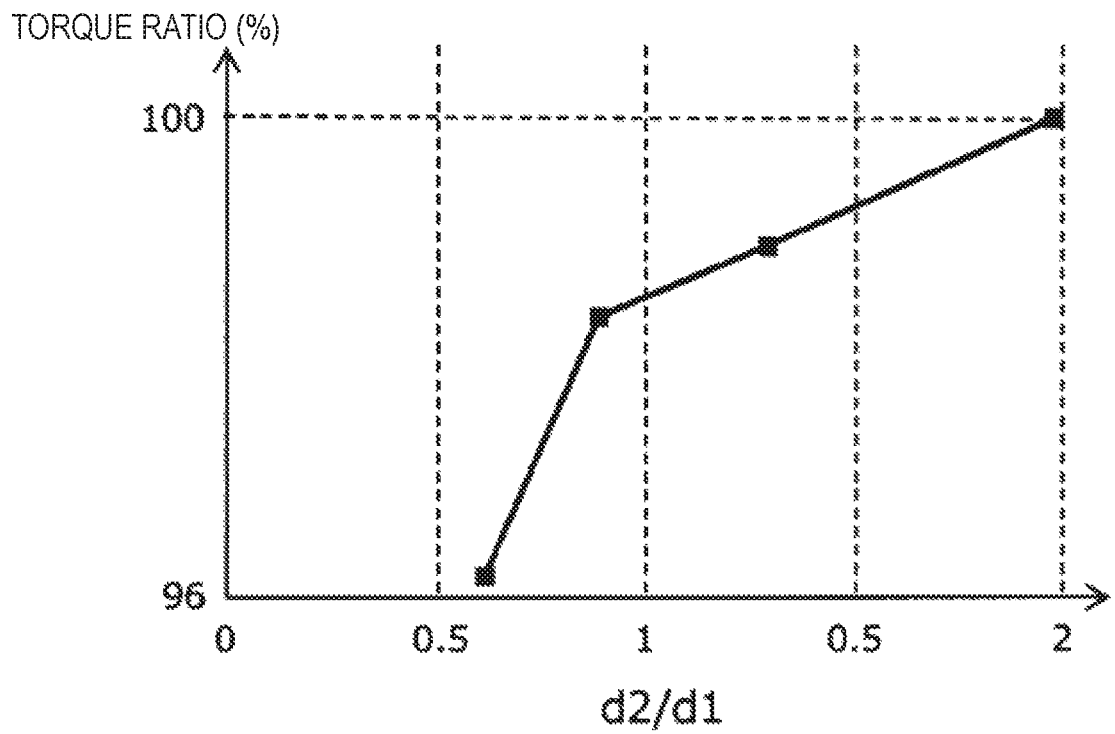
FIGS. 5A and 5B are graphs showing a torque change due to a change of a demagnetization resistance with respect to a ratio of a radial thickness d1 of the permanent magnet on the outer circumference side and a radial thickness d2 of the permanent magnet on an inner circumference side.
Figure 5B:
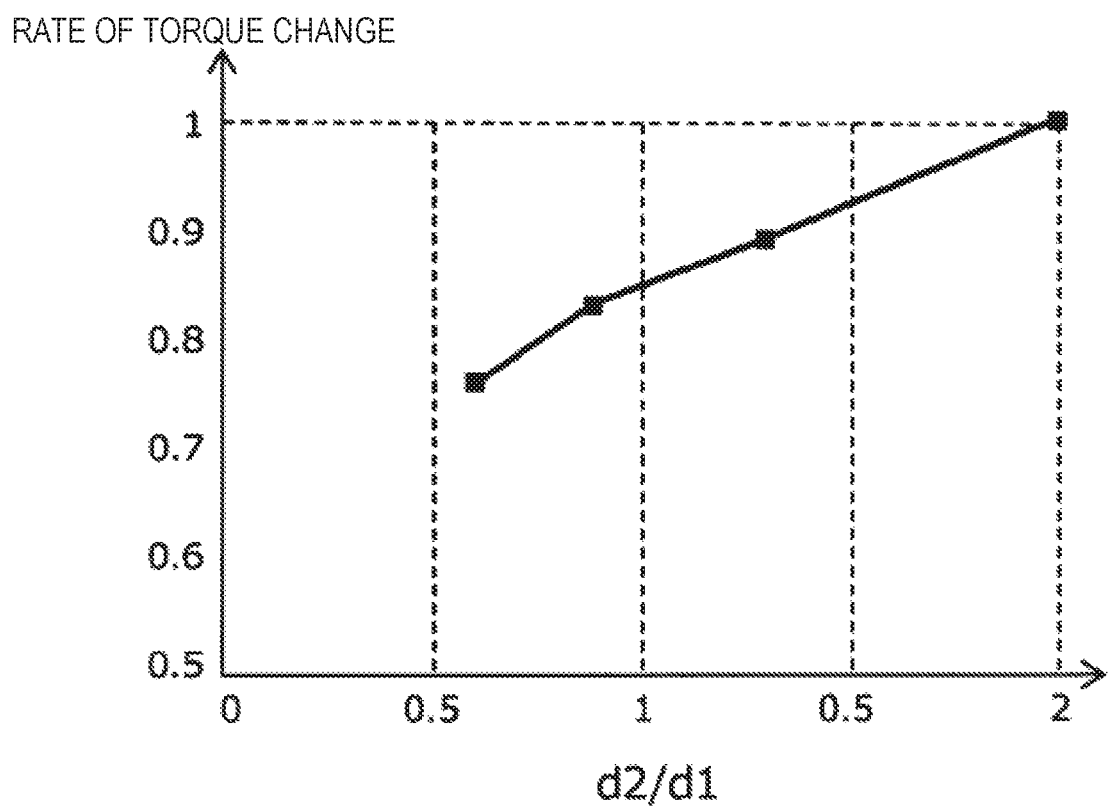

FIGS. 5A and 5B are graphs showing the torque change according to the change of the demagnetization resistance with respect to a ratio (d2/d1) between the radial thickness d1 of the permanent magnet 24a and the radial thickness d2 of the permanent magnet 24b. FIG. 5A shows a torque ratio with respect to the d2/d1 ratio of 2 or less when the torque of the rotary electric machine having the structure of d2/d1=2 is set as 100%. FIG. 5B shows a rate of a torque change with respect to the d2/d1 ratio of 2 or less when the rate of the torque change of the rotary electric machine having the structure of d2/d1=2 is 1 in a case where the average of the permeance coefficients of the permanent magnets 24a, 24b is calculated. As illustrated in FIGS. 5A and 5B, compared to a case where the ratio (d2/d1) of the radial thickness d2 with respect to the radial thickness d1 is 2, the ratio is decreased and the difference between the permeance coefficients of both two permanent magnets 24a, 24b is increased, so that the demagnetization resistance deteriorates. As a result, the torque is decreased. Therefore, the rotary electric machine in which the torque is increased most can be obtained in the structure where the ratio (d2/d1) of the radial thickness d2 with respect to the radial thickness d1 is 2.

Figure 6:
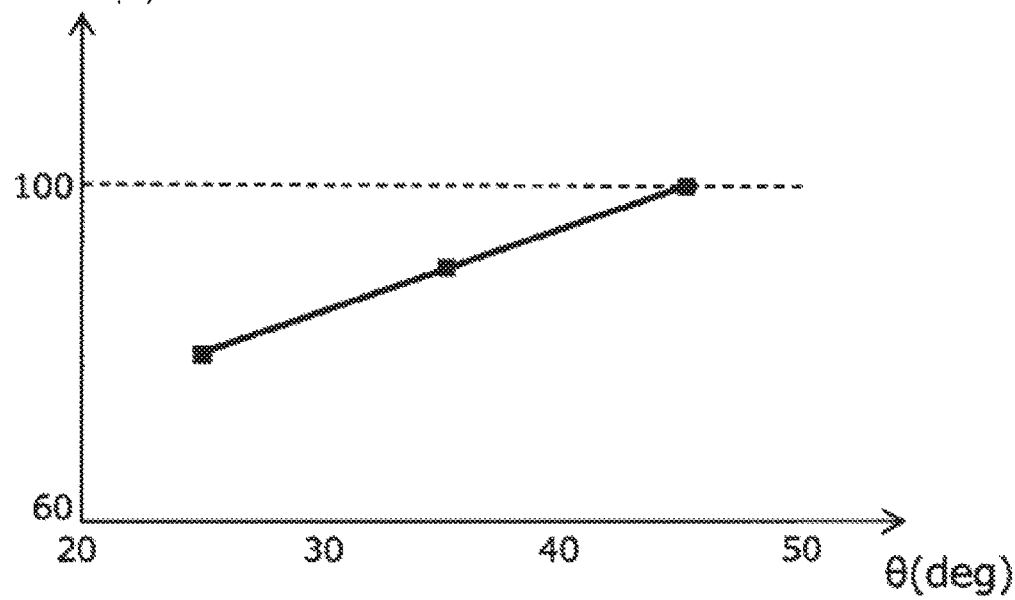
FIG. 6 is a graph showing the torque change with respect to an angle θ.

The torque capacity of the rotary electric machine is changed also by the angle θ formed by the line segment A and the line segment B illustrated in FIG. 2. FIG. 6 is a graph showing a torque change with respect to the angle θ. As illustrated in FIG. 6, when the torque in the condition of θ=45° is set as 100%, the torque is decreased when the angle θ decreases. It is considered that when the angle θ is small, a distribution having high permeance coefficient of the permanent magnet 24b is reduced, and the utilization factor of the permanent magnet 24b is decreased. Therefore, the angle θ is preferably larger.

In this embodiment, the curved longitudinal length L2 of the permanent magnet 24b is equal to or larger than the curved longitudinal length L1 of the permanent magnet 24a, and the longitudinal end surfaces 24ae, 24be, which face the outer circumferential surface 22a of the rotor core 22, of the two permanent magnets 24a, 24b are positioned on the same line segment B which passes through the center point Om of the circles including the circular arcs formed by the permanent magnets 24a, 24b. When the curved longitudinal length L2 of the permanent magnet 24b is equal to or larger than the curved longitudinal length L1 of the permanent magnet 24a, the permeance coefficient of the permanent magnet 24b approximates to the permeance coefficient of the permanent magnet 24a. When the end surfaces 24ae, 24be of the permanent magnets 24a, 24b are positioned on the same line segment B, the permeance coefficients of the two permanent magnets 24a, 24b approximate to each other most equally, and thus the demagnetization resistance can be maximized.

In this embodiment, the gap Rp formed between the radial inner end surface of the permanent magnet 24a and the radial outer end surface of the permanent magnet 24b is approximately equal to the circumferential length of the tooth 31 of the stator 30. Thus, the reluctance torque in a q-axial direction in the rotary electric machine 10 is increased, and the torque capacity of the rotary electric machine can be improved. Further, in a case where the gap Rp is a length which is equal to or larger than the radially inner side length ST1 of the tooth 31 and is equal to or smaller than the radially outer side length ST2 of the tooth 31, the reluctance torque in the q-axial direction in the rotary electric machine 10 can be maximized, and the torque capacity of the rotary electric machine can be improved to the maximum.

Figure 7:
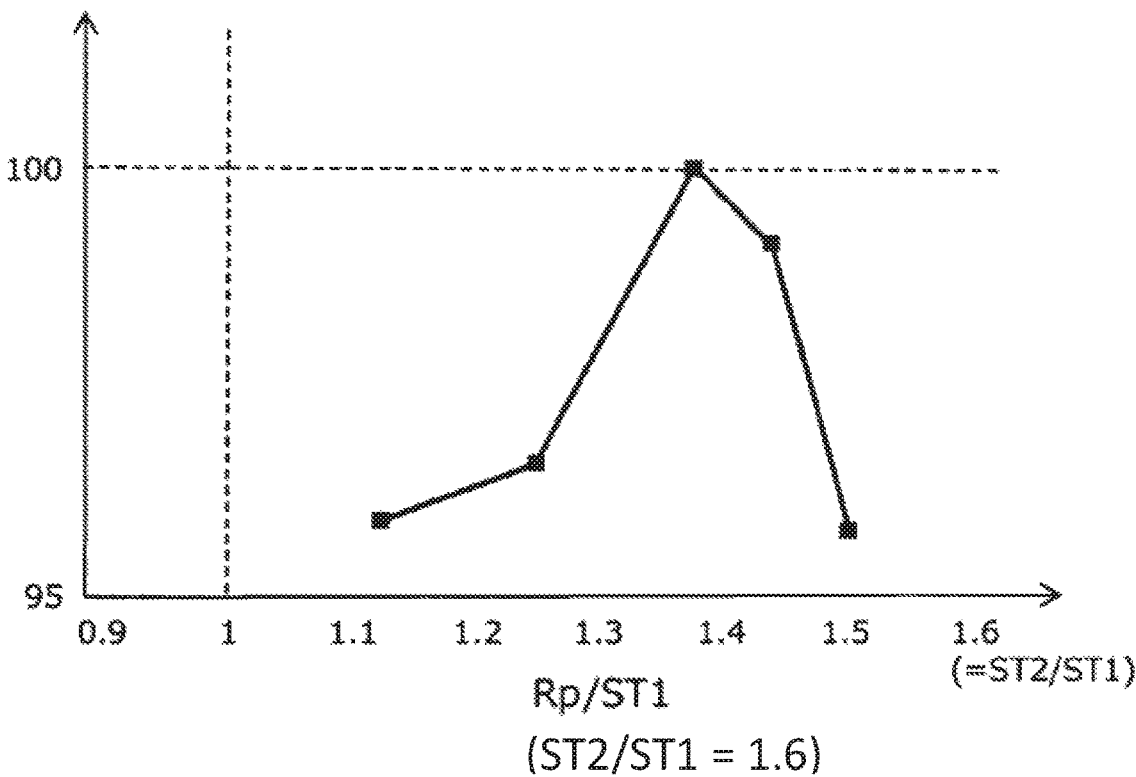
FIG. 7 is a graph showing the torque change with respect to a ratio between a radially inner side length ST1 of a tooth and a radial gap Rp of two permanent magnets.

FIG. 7 is a graph showing a torque change with respect to a ratio (Rp/ST1) between the radially inner side length ST1 of the tooth 31 and the gap Rp. The ratio (ST2/ST1) between the radially outer side length ST2 and the radially inner side length ST1 of the tooth 31 is 1.6. As illustrated in FIG. 7, when the gap Rp with respect to the radial inner length ST1 of the tooth 31 is 1.4, the reluctance torque in the q-axial direction in the rotary electric machine 10 can be maximized. Therefore, if the rotary electric machine is configure such that the gap Rp is equal to or larger than the radial inner length ST1 of the tooth 31 and equal to or smaller than the radially outer length ST2 and has a relation of Rp/ST1=1.4, the torque capacity can be improved to the maximum.

Figure 8:
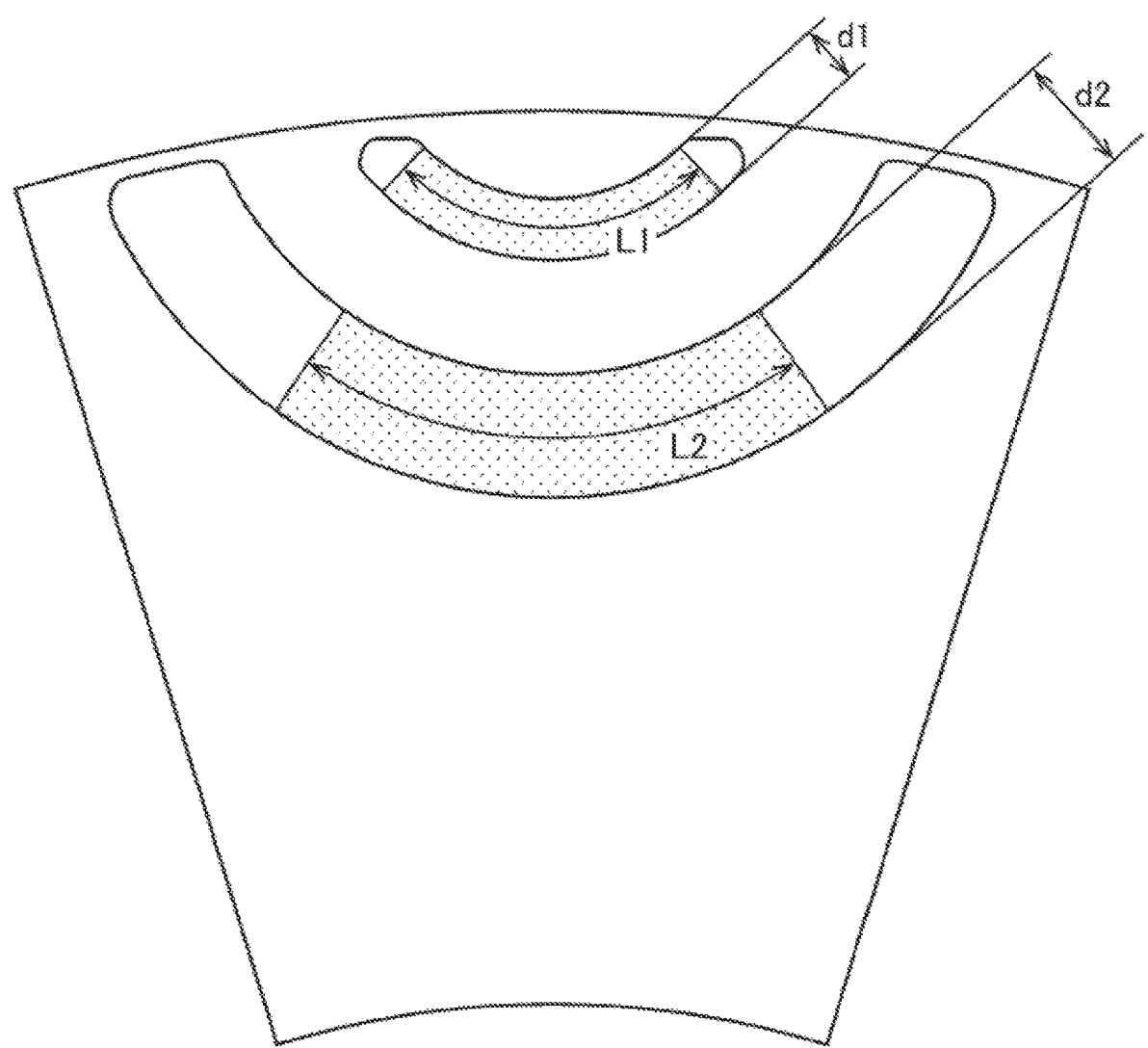
FIG. 8 is an enlarged view of a portion corresponding to one magnetic pole of a rotor of a rotary electric machine according to another embodiment when viewed in the axial direction.

The present invention is not limited to the above-described embodiment, and a modification, a variation or the like can be made appropriately. For example, in the embodiment, as illustrated in FIG. 2, the curved longitudinal length L1 of the permanent magnet 24a and the curved longitudinal length L2 of the permanent magnet 24b are set to satisfy a relation of "L1≤L2", and the respective end surfaces 24ae, 24be of the permanent magnets 24a, 24b are positioned on the same line segment B which passes through the center point Om. However, as illustrated in FIG. 8, as long as a relation of "L1≤L2" is satisfied, even if the end surfaces 24ae, 24be are not positioned on the same line segment, the permeance coefficient of the permanent magnet 24b approximates to the permeance coefficient of the permanent magnet 24a. Thus, the difference between the permeance coefficients of both two permanent magnets 24a, 24b becomes smaller, and the demagnetization resistance can be maximized.

Figure 9:
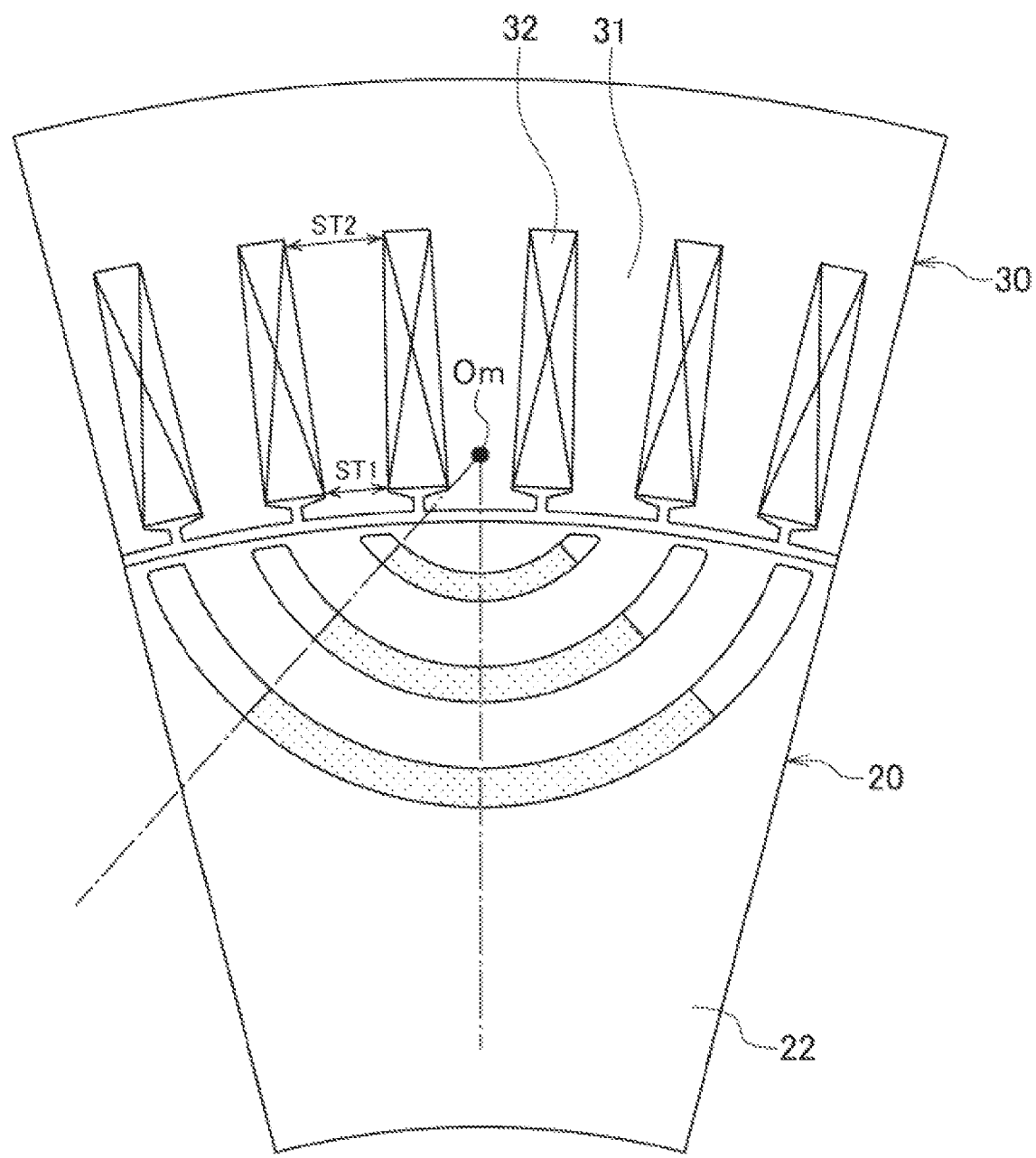
FIG. 9 is an enlarged view of a portion corresponding to one magnetic pole of a rotor and a stator of a rotary electric machine of a further embodiment when viewed in the axial direction.

Further, in the embodiment, one magnetic pole 45 is configured by the pair of two permanent magnets 24a, 24b arranged radially. However, as illustrated in FIG. 9, one magnetic pole may be configured by three or more permanent magnets arranged radially. Also in this case, the permanent magnets are set such that the radial thicknesses of three permanent magnets arranged radially are enlarged toward the rotation shaft 21 of the rotor 20, and the curved longitudinal lengths are also lengthened toward the rotation shaft 21 of the rotor 20. As a result, the difference between the permeance coefficients of three or more permanent magnets can be decreased, and the demagnetization resistance can be improved.

The invention claimed is:
1. A rotor of a rotary electric machine comprising:
   a rotor core of an approximately annular shape which is formed with a plurality of sets of plural concentric magnet insertion holes, the plurality of sets being arranged in a circumferential direction with a prede- termined gap, the plural concentric magnet insertion holes being arranged radially in each set; and a plurality of permanent magnets which are inserted into the magnet insertion holes, respectively, wherein each permanent magnet has a circular arc shape, which has a constant radius entirely over the permanent magnet in a circumferential direction of the permanent magnet, in a radial section, and a curved surface of the permanent magnet is convex toward a rotation shaft of the rotor, wherein plural permanent magnets which are respectively inserted into the radially arranged plural concentric magnet insertion holes in each set include a first permanent magnet which is positioned on an outer circumferential surface side of the rotor core and a second permanent magnet which is positioned on a rotation shaft side of the rotor and has a radial thickness larger than a radial thickness of the first permanent magnet, wherein a curved longitudinal length of the second permanent magnet is equal to or larger than a curved longitudinal length of the first permanent magnet, wherein a longitudinal end surface of the first permanent magnet, which is a circumferential end surface of a circular arc of the first permanent magnet that faces an outer circumferential surface of the rotor core in the radial section, and a longitudinal end surface of the second permanent magnet, which is a circumferential end surface of a circular arc of the second permanent magnet that faces the outer circumferential surface of the rotor core in the radial section, are axial surfaces positioned on and parallel to a line segment which passes through a common center point of the circular arc of the first permanent magnet and the circular arc of the second permanent magnet, and wherein the common center point is determined according to the radially arranged plural concentric magnet insertion holes into which the plural permanent magnets are respectively inserted.

2. The rotor according to claim 1, wherein a gap formed between a radial inner end surface of the first permanent magnet and a radial outer end surface of the second permanent magnet on a line which passes through a common center point of a circular arc formed by the first permanent magnet and a circular arc formed by the second permanent magnet is approximately equal to a circumferential length of a tooth of a stator which is provided on an outer circumference side of the rotor and generates a rotating magnetic field.

3. The rotor according to claim 2, wherein the gap is equal to or larger than a radially inner side length of the tooth and equal to or smaller than a radially outer side length of the tooth.

4. The rotor according to claim 1, wherein the rotor core is formed with three magnet insertion holes arranged radially in each set, and wherein radial thicknesses of three permanent magnets which are respectively inserted into the three magnet insertion holes in each set become larger toward the rotation shaft of the rotor.

5. The rotor according to claim 1, wherein when a gap formed between a radial inner end surface of the first permanent magnet and a radial outer end surface of the second permanent magnet on a line which passes through a center point of a circular arc formed by the first permanent magnet and a center point of a circular arc formed by the second permanent magnet is Rp, and a minimum circumferential length of a tooth of a stator which is provided on an outer circumference side of the rotor and generates a rotating magnetic field is ST1, Rp/ST1=1.4 is satisfied.

6. The rotor according to claim 1, wherein the radial thickness of the first permanent magnet is uniform along a circular arc thereof, and the radial thickness of the second permanent magnet is uniform along a circular arc thereof.

7. The rotor according to claim 1, wherein when the radial thickness of the first permanent magnet is d1, and the radial thickness of the second permanent magnet is d2, a ratio d2/d1 is 2.

* * * * *